3,373,160
PROCESS FOR OXYGENATING SOLID CYCLIC ACETALS AND PRODUCTS OBTAINED THEREBY

Carol K. Ikeda, Wallingford, Pa., assignor to E. I. du Pont de Nemours and Company, Wilmington, Del., a corporation of Delaware
No Drawing. Continuation-in-part of application Ser. No. 111,174, May 19, 1961. This application Oct. 1, 1963, Ser. No. 312,882
The portion of the term of the patent subsequent to June 8, 1983, has been disclaimed
12 Claims. (Cl. 260—248)

This application is a continuation-in-part of application Ser. No. 111,174, filed May 19, 1961, now abandoned.

This invention relates to improving the air-drying properties of normally solid cyclic acetals by blowing them. It is more particularly directed to improving the air-drying properties of normally solid cyclic acetals which contain a plurality of 1,3-cyclic acetal radicals bearing a vinyl or isopropenyl group in the 2-position, and which are linked together by an interposed polyvalent radical, by oxygenation.

These solid cyclic acetals and their air-drying properties are disclosed in my U.S. Patents 3,010,918 and 3,010,923. While films formed from these solid cyclic acetals are acceptable, it has been found that their quality can be upgraded by first intimately contacting the solid cyclic acetal, in a molten state, with gaseous oxygen throughout its mass before use.

Treating these compounds in this fashion has the added advantage of converting the normally solid acetal into a normally liquid form. This makes it possible to formulate coating compositions containing 100% solids.

Products of this invention with metal drier present dry rapidly in air at room temperature. They have viscosities which can be controlled and usually are in the upper portion of the broad range of viscosities used in the organic coating industry. These high range viscosities are particularly useful in regulating the application, smoothness and flow-out properties of coatings embodying these products. The products are also good pigment dispersing media, a necessary property for manufacturing reproducible and saleable pigmented enamels. The products further are compatible with a broad range of film-forming materials which are well established in the organic coating art. This property provides the coating formulator with desirable latitude to modify the film-forming materials of this invention with those of the prior art, or vice versa, to produce coatings having simultaneously the optimum advantages of each component. In addition, products of this invention have the property of rapid and excellent wetting of relatively hydrophilic surfaces to be painted. Such surfaces depend on wetting ability for its contribution to the ultimate protection of the surface by an adherent coating.

The starting materials for the process and products of this invention are cyclic acetals which in their convenient pure or crude forms are either crystalline solids or heterogeneous solids containing a crystalline solid phase at normal industrial working-area temperatures, e.g., 60°–90° F. Obviously it is desirable, for the purpose of easily placing the starting materials in fluid form for treatment according to this invention, that they melt at a convenient temperature, e.g., below about 250° C., and/or be rather readily soluble in a volatile inert solvent.

Materials fulfilling these requirements are known in the art and are represented by the following:

Isophthalic acid diester of 5-hydroxymethyl-5-methyl-2-vinyl-1,3-dioxane. This compound has the structural formula

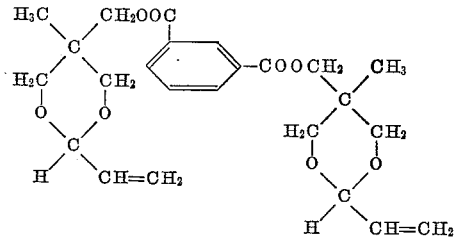

Other names for this compound are bis[(2-vinyl-5-methyl-1,3-dioxan-5-yl)methyl] isophthalate and bis(2-vinyl-5-methyl-1,3-dioxane-5-methyl) isophthalate. This general relation between different names for the same compound is applicable to related compounds disclosed herein.

Cyanuric acid triester of 4-hydroxymethyl-2-vinyl-1,3-dioxolane. This compound has the structural formula

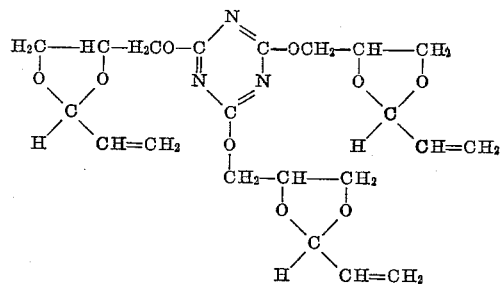

Another name for this compound is tris(2-vinyl-1,3-dioxolane-4-methyl)cyanurate.

Sebacic acid diester of 5-hydroxymethyl-5-methyl-2-isopropenyl-1,3-dioxane. This compound has the structural formula

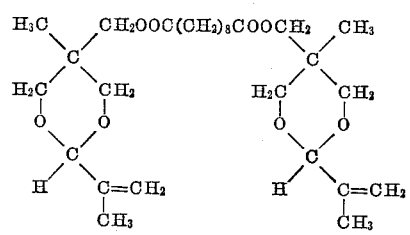

The corresponding esters of alcohols and acids set forth below under A and B, respectively; these include the three esters described above:

A. *Alcohols.*—5-hydroxymethyl-5-methyl-2-vinyl-1,3-dioxane; 5-hydroxy-2-vinyl-1,3-dioxane; 4-hydroxymethyl-2-vinyl-1,3-dioxolane and 2-isopropenyl homologs of these alcohols.

B. *Acids.*—Ortho, iso, and terephthalic acids, succinic, adipic, azelaic, sebacic, cyanuric, tolylene dicarbamic, symmetrical sulfonyl dipropionic.

Further representative starting materials are the symmetrical sulfonyl dipropionic acid diesters of 4-omega hydroxybutyl-2-vinyl-1,3-dioxolane or 4-omega hydroxybutyl-2-isopropenyl-1,3-dioxolane, also the tolylene dicarbamic acid esters of these substituted dioxolanes.

In addition to ester structures linking two or more residues of the above-mentioned hydroxyl-containing cyclic acetals, other linkages such as ether linkages can be used as in the diethers of dimethylol urea with the alcohols set forth under A above.

The representative starting materials set forth above contain two or more 2-vinyl (or 2-isopropenyl) 1,3-cyclic acetal radicals connected to each other through an interposed polyvalent radical. Diallylidene pentaerythritol represents a suitable starting material not containing such an interposed connecting radical; instead the two dioxane rings of this compound share a carbon atom in a spiro configuration.

The preferred starting materials are diesters of a dicarboxylic (e.g., phthalic or $C_4$–$C_{10}$ aliphatic) acid and an hydroxy substituted or an omega hydroxyalkyl (e.g., hydroxymethyl to hydroxybutyl) substituted 1,3-cyclic acetal (e.g., dioxolane, dioxane, dioxepane, etc.) having a 2-vinyl or 2-isopropenyl substituent.

The process of this invention consists essentially of aerating or oxygenating material of the type previously described, either alone or mixed with other material not adversely affected by the treatment. The process is carried out generally by treating a molten or dissolved mass of such a material with gaseous oxygen whereby said mass is intimately contacted throughout with oxygen.

A preferred form of this process involves bubbling air, oxygen, or a mixture of oxygen with innocuous gas through a fluid body of such a material. The bubbling rate is preferably such that the resulting turbulence is like violently boiling water. The preferred temperature is about 75°–150° C., and the time is preferably kept within the convenient range of about 20 minutes to 7 or 8 hours, with the shorter time periods usually accompanying the higher temperatures and vice versa.

In alternative process variations, modifiers can be included such as small proportions of soluble metallic driers of the type used in the organic coating industry, or sources of free radicals, e.g., azobisnitriles and peroxy compounds. The process can be carried out under ultraviolet or actinic radiation.

Mechanical agitation can be used as a supplement to the spontaneous mixing effect of bubbling. This is especially true when a costly form of oxygen is used and the bubbling rate is minimized to reduce losses. Violent, whipping-type agitation under an atmosphere of air or oxygen is an alternative to bubbling.

With other operating conditions remaining the same, the degree of change effected by the process usually increases with time, temperature and amount of oxygen supplied. Therefore when one is increased, one or both of the others are usually decreased to provide an element of convenience in controlling the process. In general, temperatures approaching the boiling, ignition or decomposition temperatures of the starting material or the product are avoided, and about 250° C. is a maximum convenient temperature. The time of processing can be from a few minutes, e.g., 10, to several hours, e.g., as much as 24–48 hours or longer if convenient. Since gelation can result from one or more of the time, temperature and oxygen consumption factors, and ungelled products are preferred, the overall conditions are preferably adjusted by experience to produce the viscosity and degree of oxygenation desired.

Still further modifications of the process of this invention include exposing the vapor, droplets or a falling film of cyclic acetal to oxygen under suitable time and temperature conditions.

The products of the process of this invention appear to be complex mixtures of a wide variety of substances. Even the lightly oxygenated product from a given starting material appears to be substantially different in complexity than its heavily oxygenated counterpart, each having different properties and/or different degrees of the same or related properties. The preferred products have consistencies between the readily pourable and the highly viscous stages, form continuous films, convert to dry coatings which are insoluble in a solvent for the starting material, are good pigment dispersing media, are compatible with other film-forming materials and have other desirable properties of coating materials.

Some of the products of the process of this invention are readily pourable. These lend themselves to the easy preparation of solvent-free liquid end products, a type especially desirable because the wet coating yields substantially its own thickness of dry coating, and the cost and fire hazard of solvents are eliminated. However, the products which are highly viscous can be combined with more fluid coating materials or with common solvents and can be used in solution form. Likewise, materials treated in solution form according to this invention can be left in solution for subsequent use if desired.

Suitable solvents include aliphatic and aromatic liquid hydrocarbons, esters, ketones, alcohols and mixtures thereof.

Products of the process of this invention can be used in clear, unpigmented coating compositions, with solvent if required for convenience of application. They can be pigmented, using proportions well known in the art, with common coating-grade pigments, such as metal oxides, sulfides, sulfates, silicates, chromates, carbon blacks, iron blues, organic colors, and metal flake pigments. As is the case with other air-drying materials, some pigments inhibit drying. These are to be avoided in coating compositions formulated to dry at ordinary temperatures, but they can be used if the coatings can be force-dried or baked.

Individually or mixed, the products of the process of this invention can be the sole organic film-forming component of coating compositions, or they can be blended with other known film-formers such as glyceride oils and their synthetic counterparts, polyesters, oil-modified alkyd resins, oleoresinous varnishes, unsaturated cyclic acetals, alkylated urea aldehyde resins, alkylated melamine aldehyde resins, polyepoxypolyhydroxy resins, phenol aldehyde resins, cellulose acetate, cellulose acetate butyrate, polymers and copolymers of vinyl and vinylidene compounds such as vinyl chloride, vinylidene chloride, vinyl acetate, acrylic and methacrylic acid and the esters thereof, styrene, butadiene, and the like; polymerizable liquids like the dimethacrylates of glycols and polyglycols; elastomers such as neoprene, styrene-butadiene rubbers, acrylonitrile-butadiene rubbers and isobutylene-isoprene rubbers; polyurethanes, and silicones.

Other common ingredients of organic film-forming compositions can be used in the manner and in proportions well known in the art. These include plasticizers, catalysts, hardeners, anti-skinning agents and surface active agents. Particularly included in this class of additives are metallic driers, i.e., the commonly used naphthenate, linoleate, resinate, tallate, octoate (2-ethyl hexoate) or other salts or soaps of siccative metals such as cobalt, lead, iron, manganese, zinc, calcium, nickel and copper. Such driers are commonly used in the organic art to speed up the drying and ultimate insolubilization of air-drying compositions, and they have a similar effect on the oxygenated products and the compounded coating compositions of this invention. Thus, compositions derived from the new oxygenated products preferably contain one or more of such driers. A particularly preferred drier metal is cobalt. The proportion of drier is usually within the range of 0.0005%–3% of metal (in the drier) based on the weight of air-drying film-forming material.

It is well known that the drying speed of air-drying compositions can be increased not only by adding drier but also by heating, or a combination thereof. The drying of compositions containing oxygenated products of this invention can likewise be hastened. Temperatures moderately above room-temperature, e.g., 100°–150° F., usually hasten drying enough but, where desirable, the compositions can be baked at higher temperatures, e.g., 200°–400° F. for short periods.

The products of this invention are useful primarily in paints, enamels, varnishes, other coatings and related materials for protecting and decorating architectural and industrial structures, furniture, automobiles, appliances for home and industry, linoleum, coated or impregnated fabrics and the like. Such coatings are applied by conventional methods including brushing, spraying, roller coating, knifing and dipping.

Other uses include adhesive and laminating compositions, casting compositions for the preparation of shaped articles, caulking and sealing compositions, and potting and impregnating compositions.

The following examples illustrate the principles and practice of this invention, but they are not to be interpreted as limitations of the invention. Unless otherwise indicated, the parts and percentages are given by weight. Viscosities are given at 25° C.

It is to be understood that the aforementioned starting materials can be substituted for all or part of a corresponding material in these examples and that analogous results will be produced. Quite naturally, such substitutions suggest minor adjustments in conditions such as temperature and time. Also different degrees of the resulting properties are to be expected from different starting materials, as illustrated.

EXAMPLE 1

91 parts by weight of solid sebacic acid diester of 5-hydroxymethyl-5-methyl-2-vinyl-1,3-dioxane are placed in a flask equipped with a thermometer, agitator and an air inlet tube extending to the bottom. The charge is melted and 0.3 part of t-butyl perbenzoate is admixed therewith. With air being bubbled through the molten mass and with sufficient agitation to resemble violently boiling water, the charge is held at about 105° C. for six hours. The air feed rate averages about 2.4 parts by weight per hour.

The resulting product is a homogeneous, substantially colorless, transparent liquid having a viscosity of Z6 in the Gardner-Holdt bubble tube series. This liquid has air-drying film-forming properties as evidenced by the following:

In a sample of this liquid is admixed 0.05% cobalt metal in the form of a xylene solution of cobalt butyl phthalate (solution assays 4% cobalt). A test coating of this mixture is drawn on glass under a doctor blade having a 4.2 mil clearance. This dries to a continuous, clear, hard, adherent, xylene-insoluble, varnish-like coating in 24 hours' exposure to air at room temperature.

Utility as a casting syrup for preparing shaped articles and the property of polymerizing in bulk are demonstrated by the fact that a sample of the mixture prepared immediately above spontaneously converts to a hard, clear, cylindrical rod when permitted to stand in a vertical cylindrical glass tube for about 48 hours.

EXAMPLE 2

45.4 parts by weight of solid sebacic acid diester of 5-hydroxymethyl-5-methyl-2-vinyl-1,3-dioxane are placed in a flask equipped with a thermometer, agitator and oxygen inlet from a gas-measuring burette filled with oxygen. Air in the closed system is replaced with oxygen.

With the application of heat, the solid melts. It is held molten for 8 hours at 95°–105° C. under an oxygen atmosphere with vigorous whipping agitation, whereby oxygen is brought into intimate contact with the whole mass of the material treated. The system is then cooled to room temperature.

Approximately 1.44 parts by weight of oxygen are consumed during this period.

The resulting product is a homogeneous, substantially colorless, transparent liquid having a viscosity of X+ in the Gardner-Holdt bubble tube series. This liquid has air-drying film-forming properties as evidenced by the following:

In a sample of this liquid is admixed 0.05% cobalt metal in the form of a xylene solution of cobalt butyl phthalate drier (solution assays 4% cobalt). Test coatings of this mixture are drawn on hardwood, steel and glass under a doctor blade having a 4.2 mil clearance, leaving coatings 2–3 mils thick. These coatings are exposed to air at room temperature, and the drying of the coatings progresses spontaneously through the wet, tacky and tack-free stages to the hard dry stage in approximately two days.

The resulting varnish-like or lacquer-like coatings are continuous, homogeneous, clear, glossy, adherent and tough. They serve the purposes of protecting and enhancing the appearance of the surfaces thus coated.

Utility of this material as a casting syrup for preparing shaped articles and the property of polymerizing in bulk are demonstrated by the spontaneous conversion of the coating mixture described above to a hard, tough, clear, faintly pink, cylindrical rod of plastic when permitted to stand in a vertical cylindrical glass tube for about 16 hours.

EXAMPLE 3

The oxygenating procedure of Example 2 is repeated, with the following changes:

0.2 part of t-butyl perbenzoate is admixed with the diester as soon as the latter becomes molten.

The period of heating is reduced from 8 hours to 3 hours.

The resulting product duplicates the appearance and the film-forming and drying properties of the product of Example 2. It has a viscosity of X+ on the Gardner-Holdt scale, and is approximately one-quarter bubble lighter than the product of Example 2.

EXAMPLE 4

| | Parts by weight |
|---|---|
| First portion: | |
| Product of Example 3 | 100 |
| Titanium dioxide pigment | 100 |
| Second portion: | |
| Xylene | 50 |
| Cobalt drier solution (assay 1% cobalt) | 10 |

An enamel having this formula is prepared by grinding the ingredients of the first portion in paint grinding apparatus until a smooth uniform dispersion is obtained and admixing therewith the ingredients of the second portion.

Coatings of this enamel on steel, glass and primed wood dry to hard, adherent, semi-gloss, xylene-insoluble coatings in approximately 2 days in air at room temperature. Drying is hastened by baking or force drying as evidenced by producing tack-free coatings in 30 minutes in an oven at 100° C.

EXAMPLE 5

Another pigmented coating composition having the following formula is prepared in a similiar manner:

| | Parts by weight |
|---|---|
| Product of Example 3 | 100 |
| Coconut oil modified alkyd resin solution, 60% in xylene | 20 |
| Titanium dioxide pigment | 100 |
| Xylene | 35 |
| Drier solution, cobalt butyl phthalate in xylene (assay 4% cobalt) | 2.7 |

A coating of this product, force dried for 30 minutes at 100° C. is tack-free, moderately hard and is glossy and adherent.

EXAMPLE 6

Another pigmented coating composition having the following formula is prepared in a similar manner:

| | Parts by weight |
|---|---|
| Product of Example 3 | 70 |
| Coconut oil modified alkyd resin solution, 60% in xylene | 10 |
| Homopolymer of methyl methacrylate, solution; 40% in mixture of toluene and acetone; viscosity Z | 80 |
| Titanium dioxide pigment | 100 |
| Xylene | 54 |
| Drier solution, cobalt butyl phthalate in xylene (assay 4% cobalt) | 2.6 |

A coating of this product air dries in 2 hours at room temperature to give a tack-free, glossy, hard and adherent coating.

EXAMPLE 7

In the apparatus and by the procedure described in Example 2 above, 44.6 parts of the isophthalic acid diester of 5-hydroxymethyl-5-methyl-2-vinyl-1,3-dioxane (an opaque waxy solid containing a crystalline phase) are oxygenated for 4 hours at 110°–120° C.

Approximately 1.53 parts of oxygen are consumed.

The resulting product is a homogeneous, substantially colorless, transparent liquid having a viscosity of approximately the maximum for the Gardner-Holdt bubble tube series. A 75% solution in xylene has a viscosity of L.

Cobalt drier solution is admixed with this 75% solution to provide 0.2% cobalt metal based on the oxygenated product in the solution.

Test coatings of the resulting composition dry in air at room temperature to a tack-free stage in 8 hours. The resulting coatings are continuous, homogeneous, clear, glossy, adherent and tough.

A coating of the above-mentioned 75% solution in xylene, free of cobalt drier, becomes tack-free upon force drying for 30 minutes in an oven at 150° C. The resulting coating has properties like the air-dried coating.

EXAMPLE 8

A pigmented coating composition having the following formula is prepared as described in preceding examples:

| | Parts by weight |
|---|---|
| Product of Example 7 solution; 75% in xylene | 107 |
| Cellulose acetate butyrate, half-second grade, solution; 16.7% in diacetone alcohol and methyl ethyl ketone (50:50) | 120 |
| Titanium dioxide pigment | 100 |
| Drier solution, cobalt butyl phthalate in xylene (assay 4% cobalt) | 2.5 |

A coating of this product air dries in 2 hours at room temperature to give a tack-free, glossy, hard and adherent coating.

EXAMPLE 9

In the apparatus and by the procedure described in Example 2 above, 225 parts of the cyanuric acid triester of 4-hydroxymethyl-2-vinyl-1,3-dioxolane (melting point approximately 125° C.) are oxygenated for 3 hours at 80°–95° C., said triester being in solution in 105 parts of orthodichlorobenzene containing 1 part of alpha, alpha'-azobisisobutyronitrile.

Approximately 6 parts of oxygen are consumed.

The resulting product is a homogeneous, substantially colorless, transparent liquid having a viscosity of Z5 and a solids content of approximately 70%.

A coating of this product further containing cobalt drier in the amount of 0.05% cobalt on the solids content is applied to a test panel by drawing under a 4.2 mil doctor blade. The resulting coating air dries to the tack-free stage in 3.5 hours and yields a clear, continuous, adherent coating.

EXAMPLE 10

In the apparatus and by the procedure described in Example 2 above, 30 parts of the solid symmetrical sulfonyl dipropionic acid, i.e., $SO_2(CH_2CH_2COOH)_2$, diester of 4-omegahydroxybutyl-2-vinyl-1,3-dioxolane (melting point approximately 35° C.) are oxygenated for 1 hour at 79°–90° C.

Approximately 0.465 part of oxygen is consumed.

The resulting product is a homogeneous, pale yellow, transparent liquid having a Gardner-Holdt viscosity of Z3.

In the presence of cobalt drier (0.05% metal based on the above liquid), and upon exposure to air at room temperature for 4 hours, this material produced a dry pliable film having a uniform wrinkled texture.

EXAMPLE 11

In the apparatus and by the procedure described in Example 2 above, 424 parts of crystalline diallylidene pentaerythritol, i.e., 3,4-divinylspirobi(m-dioxane), are oxygenated for 1.5 hours at a temperature of 75°–83° C., said compound being in solution in 867 parts of toluene containing 5 parts of alpha,alpha'-azobisisobutyronitrile.

Approximately 10 parts of oxygen are consumed.

The resulting product is transparent solution having a Gardner-Holdt viscosity of A+ and a solids content of approximately 33%.

Coatings of this material in the presence of 0.05% cobalt based on the oxygenated dioxane compound are tack-free, hard, adherent and colorless upon drying in air at room temperature or force drying for 15 minutes in an oven at 135° C.

EXAMPLE 12

In the apparatus and by the procedure described in Example 2 above, 200 parts of solid dimethylol urea diether of 4-hydroxymethyl-2-vinyl-1,3-dioxolane are oxygenated for 3 hours at 77°–79° C., said diether being in solution in 200 parts of orthodichlorobenzene containing 1 part of alpha,alpha'-azobisisobutyronitrile.

Approximately 0.64 part of oxygen is consumed.

The resulting product is a transparent solution having a Gardner-Holdt viscosity of I and a solids content of approximately 50%.

Coatings containing 0.05% cobalt based on the solids are tack-free, clear, hard and adherent after force drying for 30 minutes in an oven at 150° C.

EXAMPLE 13

The oxygenating procedure of Example 2 is repeated with substitution of the following diester for the one used in that example:

Solid sebacic acid diester of 5-hydroxymethyl-5-methyl-2-isopropenyl-1,3-dioxane.

The resulting product has substantially the same properties as the oxygenated product of Example 2.

EXAMPLE 14

70 parts of the oxidized ester prepared in Example 2 are admixed with 30 parts of the itaconic acid diester of 4-omegahydroxybutyl-2-vinyl-1,3-dioxolane and 0.01 part of cobalt in the form of cobalt butyl phthalate dissolved in xylene. A sample of this mixture in a cylindrical glass tube polymerizes to a hard, tough, bubble-free, plastic rod upon standing at room temperature.

EXAMPLE 15

The coating material containing cobalt activator, as prepared in Example 2 is applied to a surface of two pieces of wood. The pieces are clamped coating-to-coating in a vise and held together at room temperature for 16 hours. The two pieces are so well bonded together that failure occurs in the wood, rather than in the adhesive, when a strong force is applied to separate them.

It is to be understood that the auxiliary materials used in the foregoing examples, such as pigments, solvents, catalysts, activators, other film-formers and the like, merely illustrate a few of the wide variety of such materials that can be used. As will be obvious to persons skilled in the arts involved, other such materials can be used in the same or other proportions.

In the light of the teachings herein, many widely different embodiments can be made within the spirit and scope of the invention, which is limited only as indicated in the appended claims.

I claim:

1. A process for improving the air-drying properties of a normally solid cyclic acetal which contains a plurality of 1,3-cyclic acetal radicals, each bearing, in the 2-position, a radical selected from the group consisting of vinyl and isopropenyl, said cyclic acetal radicals being linked together by an interposed polyvalent radical, said process comprising contacting said solid cyclic acetal, in the molten state, with oxygen until the acetal is normally liquid.

2. The process of claim 1 in which air is bubbled through a mass of said cyclic acetal.

3. The process of claim 1 in which a free radical catalyst is present in admixture with said cyclic acetal.

4. The process of claim 1 in which said cyclic acetal is a diester of a dicarboxylic acid and an omega hydroxyalkyl-substituted 1,3-cyclic acetal.

5. The process of claim 4 in which said cyclic acetal is the sebacic acid diester of 5-hydroxymethyl-5-methyl-2-vinyl-1,3-dioxane.

6. The process of claim 4 in which said cyclic acetal is the isophthalic acid diester of 5-hydroxymethyl-5-methyl-2-vinyl-1,3-dioxane.

7. The process of claim 4 in which said cyclic acetal is the symmetrical sulfonyl dipropionic acid diester of 4-(omega hydroxybutyl)-2-vinyl-1,3-dioxolane.

8. The process of claim 4 in which said cyclic acetal is the sebacic acid diester of 5-hydroxymethyl-5-methyl-2-isopropenyl-1,3-dioxane.

9. The process of claim 1 in which said cyclic acetal is the cyanuric acid triester of 4-hydroxymethyl-2-vinyl-1,3-dioxolane.

10. The process of claim 1 in which said cyclic acetal is the diallylidene pentaerythritol.

11. The process of claim 1 in which said cyclic acetal is the dimethylol urea diether of 4-hydroxymethyl-2-vinyl-1,3-dioxolane.

12. The product of the process of claim 1.

References Cited

UNITED STATES PATENTS

| 2,609,304 | 9/1952 | Jones et al. | 106—176 |
| 2,895,962 | 7/1959 | Fischer et al. | 260—340 |
| 2,985,536 | 5/1961 | Stein et al. | 106—176 |
| 2,987,524 | 6/1961 | Fischer et al. | 260—340 |
| 3,255,210 | 6/1966 | Ikeda | 260—338 |
| 3,010,923 | 11/1961 | Ikeda | 260—340 X |

FOREIGN PATENTS 571,044   9/1958   Belgium.

NORMA S. MILESTONE, *Acting Primary Examiner.*

J. D. RANDOLPH, J. L. SCHOFER, W. A. MODANCE, *Examiners.*

H. WONG, J. N. FORD, *Assistant Examiners.*